2,792,331

CULTURE MEDIUM FOR BACTERIA

Helen A. Boxell, Oklahoma City, Okla.

No Drawing. Application March 26, 1953,
Serial No. 344,906

12 Claims. (Cl. 195—100)

This invention relates to new and improved culture media for the growth of bacteria, with particular reference to the growth of streptococci.

Although the importance of streptococci, particularly those of a pathological nature, has long been recognized, the utilization of diagnostic procedures for the identification of these organisms has been retarded, to a considerable extent because of the lack of a satisfactory medium for their growth. The growth of this group on commonly used media, such as Loeffler's medium and standard blood plates, is slow, requiring a minimum incubation period of about 48 hours, and colony formation is frequently scanty. Furthermore, the media are neither selective nor differential for streptococci.

The object of this invention is to provide a culture medium which permits rapid and luxurious growth and proliferation of streptococci in a much shorter time than has hitherto been possible.

Still another object is to provide a culture medium which is selective for streptococci.

Other objects and advantages will become obvious from the following detailed description.

I have discovered that an extract of the skin of swine, fowl and sheep, when employed as a base for the culture medium, stimulates rapid and prolific growth of substantially all varieties of streptococci. Even better results are obtained when the extract also includes bone joint material.

The skin used for extraction purposes may be obtained from any portion of the animal body and may be either fresh or cured. Any of the bone joints may be employed. In general, I prefer to use the feet of the animal because of their ready availability and low cost, because an extract may be obtained from both skin and joint components in a single operation and because the resulting extract is particularly effective.

The extract may be prepared by cooking the skin or skin and bone material in water at a temperature and for a sufficient period of time both to extract the desired components and to obtain sterilization. Tissue and bone fragments may be removed and the liquid clarified by filtering while hot. By cooling the extract to the point where the fat solidifies, the fat may be readily removed from the surface. Though not essential, it is desirable to remove all traces of fat since tiny fat droplets on the surface of the culture medium are easily confused with colonies of streptococci.

The amount of animal material employed for extraction purposes is not critical. For example, I have found that a variation of from 275 to 680 grams of swine's feet per liter of water makes no appreciable difference in the resultant growth of the organisms.

*Example I*

An extract was prepared by adding 1 liter of distilled water to about 1 lb. (454 gms.) of fresh pigs' feet and autoclaving at 121° C. for 20 minutes. The liquid was strained through 3 layers of cheese cloth to remove tissue and small bone fragments and then clarified by filtering while hot through coarse filter paper. It was then cooled to about 10°–15° C. and all traces of the solidified fat which rose to the top were removed.

*Example II*

An extract similar to the one obtained in Example I was prepared by boiling the swine's feet in distilled water for two hours over an open heating unit. The clarifying procedure was the same.

In making up the culture medium, sufficient agar may be added to the extract to give the desired consistency. If the animal feet or other bone joints have been employed, the cooled extract is gelatinous so that the amount of agar incorporated may be reduced. The agar is not essential to the medium and may be omitted entirely if a soft or fluid substrate is preferable for the particular mode of use.

In addition to the agar, it is also desirable to introduce a carbohydrate and a source of nitrogen.

The carbohydrate is preferably sucrose which may be supplied in any desired manner, as for example, in the form of commercial cane sugar, brown sugar, Difco saccharose and the like.

The nitrogen supply is preferably in the form of a peptone. Tryptose and tryptone were found to be particularly effective, apparently because of their high content of nitrogen, tryptophane, tyrosine and cystine. Other peptones tested both singly and in combination include Bacto-Peptone, Proteose-Peptone and Neo-Peptone. These were satisfactory although not quite as good as the tryptone and tryptose.

Other ingredients which are frequently employed in culture media, such as sodium chloride, yeast extract, glucose, starch and a buffer, may also be incorporated into the culture medium. However, they are not essential and may be dispensed with without appreciably affecting the growth of the microorganisms.

*Example III*

Culture media were prepared as follows:

A 1,000 ml. swine's feet extract
100 gms. commercial cane sugar
15 gms. tryptone
10 gms. agar 1,000 ml. swine's feet extract
100 gms. brown sugar
15 gms. tryptose
10 gms. agar

*Example IV*

A culture medium was prepared as follows:

1,000 ml. swine's feet extract
10 gms. tryptose
1 gm. yeast extract
5 gms. NaCl
10 gms. glucose
10 gms. sucrose
4 gms. starch
15 gms. agar The pH was adjusted with NaOH and buffered to 7.8 with phosphate buffer.

It will be understood that the proportions of the various nutrient components of the culture medium may be varied considerably and may be adjusted to the optimum requirements of the specific organisms.

All types of streptococci, when incubated on the culture media containing the extracts as aforedescribed, grew rapidly and formed well defined colonies within 24 hours. Extracts obtained from swine skin and preferably from swine skin and bone joints as, for example, swine's feet, give the best results. Extracts of the feet and skin of sheep give better growth than that obtained on media hitherto commonly used, such as Loeffler's medium and standard blood plates, but are definitely inferior to swine extracts. Extracts of the feet and skin of fowl, such as chicken, are better than sheep extracts but not quite as good as swine extracts.

*Example V*

Plates containing culture media prepared as in Examples III and IV were separately inoculated with the following streptococcus organisms obtained from the American Type Culture Collection:

*S. salivarius*
*S. faecalis*
*S. pyogenes*
*S. mitis*
*S. lactis*

The plates were incubated at a temperature of 37° C. All of the species grew abundantly and developed well defined colonies within less than 24 hours and for the most part within 20 hours.

*Example VI*

The value of the media for growing streptococci from human sources was tested by making swab plates from the throats and mouths of 35 students. The culture medium used was made as described in Example IV. The bacteria grew profusely during an incubation period of less than 24 hours. Streptococci of the Viridans group were isolated from all of the plates. Lancefield A group organisms were isolated from 3 plates which had been made from students suffering with sore throats. 39 strains of streptococci were isolated in all.

The cultured media, while especially effective for growing streptococci, also provide an excellent substrate for the growth of other types of bacteria, although molds do not thrive on it. However, the medium can be readily transformed into one which is selective and differential for the genus Streptococcus by incorporating inhibiting agents both for gram negative bacteria and for gram positive bacteria other than streptococci.

As an agent for inhibiting the growth of gram negative bacteria, I have found sodium azide particularly suitable. The concentration of the sodium azide may be varied. For example, where the number of gram negative bacteria is relatively small, the concentration of sodium azide used may be as low as 1 part to 16,000. In general, I have found that about 0.5 gram per liter of medium inhibits the growth of gram negative bacteria present in substantially any numbers and permits the streptococci to grow unhampered.

Crystal violet, when incorporated into the culture media, serves as an effective inhibiting agent for gram positive organisms, such as staphylococci which are frequently associated with streptococci, without appreciably affecting the growth of the streptococcus organisms. Other suitable gram positive inhibitors such as gentian violet may also be employed. Very small amounts of the inhibiting agent as, for example, about 1 part of crystal violet to 750,000 parts of medium, is generally adequate for my purpose.

*Example VII*

Cuplture media were prepared comprising:

1,000.0 ml. swine's feet extract
100.0 gms. commercial cane sugar
15.0 gms. Bacto-tryptose or Bacto-tryptone
10.0 gms. Bacto-agar
0.5 gm. sodium azide
0.00075 gm. Bacto-crystal violet All strains of streptococci tested on these media grew profusely within 24 hours at an incubation temperature of 37° C. Other types of bacterial organisms did not proliferate.

The appearance of colonies of the streptococci was distinctive on the medium. *Streptococcus salivarius* formed large colorless, transparent colonies up to 5 mm. in diameter on uncrowded plates. These colonies resembled drops of water on an oily surface and had the consistency of white syrup. *Streptococcus mitis* also formed raised, colorless colonies, but they were not as large as those of *S. salivarius* and extremely adherent. Colonies of Lancefield group A streptococci were small (0.5 mm.), round, smooth, opaque and white when young but absorbed the crystal violet and became purple after 48 hours or more. The colonies formed by streptococci of group D were larger than those formed by group A but not as large as those formed by the Viridans group. The average size of the *Streptococcus faecalis* colonies was 1 mm. They were also white, round, smooth and opaque. They absorbed the crystal violet and appeared lavender after 48 hours or more.

As a means for distinguishing between hemolytic and non-hemolytic varieties of streptococci, blood may be introduced into the medium. The culturem edium does not affect the hemolytic activity of the organisms.

Table I summarizes the results of comparative tests when various streptococcus organisms were grown on culture media containing extracts of the feet of swine and of fowl and on standard culture media. The swine's feet agar medium was similar in composition to that disclosed in Example VII. The swine's feet gelatine medium was identical except for the omission of agar. The fowl's feet agar and gelatin media were exactly the same in composition to the swine's feet media except for the substitution of an extract of the feet of fowl for that of swine. As in the case of the swine's feet gelatin medium, agar was omitted from the fowl's feet gelatine substrate.

The results clearly demonstrate the superiority of the swine's feet and fowl's feet extract media over the various standard culture media both in luxuriance and rapidity of growth of the organisms. Maximum growth on the swine's and fowl's feet media was obtained within 24 hours whereas the standard substrates required a minimum of 48 hours. Even after 48 hours, the growth on the standard media was considerably inferior to that on both the swine's and fowl's feet media. The fowl's feet medium was not quite so effective as the swine's feet medium but was markedly better than the standard media.

TABLE I

Table I
1. Swine's feet agar medium
2. Swine's feet gelatin medium
3. Fowl's feet agar medium
4. Fowl's feet gelatin medium
5. Nutrient agar medium
6. Nutrient broth medium
7. Loeffler's medium
8. Tryptose blood agar medium
9. Blood agar medium

|  | 1 | 2 | 3 | 4 | 5 | 6 | 7 | 8 | 9 |
|---|---|---|---|---|---|---|---|---|---|
| S. mitis | XXXX | XXXX | XXX | XXX | X | X | XXX | XXX | XXX |
| S. salivarius | XXXX | XXXX | XXX | XXX | X | X | XXX | XX | XX |
| S. pyogenes | XXXX | XXXX | XXX | XXX | — | X | XX | XX | XX |
| S. faecalis | XXXX | XXXX | XXXX | XXXX | XX | XX | XXX | XXX | XXX |
| S. liquefaciens | XXXX | XXXX | XXXX | XXXX | XX | XX | XXX | XXX | XXX |
| S. lactis | XXXX | XXXX | XX | XX | X | XX | XXX | XXX | XXX |

Media 1,2,3 and 4 were read in 24 hours.
Media 5, 6, 7, 8 and 9 were read in 48 hours, since they were not at maximum growth in 24 hours.
XXXX—excellent growth.
XXX—very good growth.
XX—good growth.
X—growth.
X—scant growth.
(—)—no growth.

The culture substrate of my invention may be employed in any procedure involving the growing of streptococci and is particularly valuable as a diagnostic medium because of the rapidity and profusion of the organismal growth. It has, for example, proven exceedingly satisfactory as a means of determining the presence of pathogenic streptococci in water.

Hitherto, the standard method of swimming pool water analysis has been based almost entirely upon the presence or absence of members of the coliform group. However, washings from the skin, mouth and nasal passages, which may contain pathogenic streptococci, are continually being discharged into the water by swimmers so that water indicated as safe after analysis according to the Standard Methods Procedure, which tests for the presence of coliform bacteria, may actually be infectious. Tests made with my culture media showed this to be the case and, furthermore, provided clear and reliable results within 24 hours.

*Example VIII*

An outdoor swimming pool, maintained and used by the Army, was the subject of study. Samples were first taken during an epidemic of septic sore throat among the swimmers. The pool had been constantly checked by the Standard Methods Procedure and was reported free from the coliform group. However, the pool was suspected as the mode of transmission for the infections. The water in the pool was chlorinated according to official standards.

A sample was taken from the pool during the summer at the time of the epidemic. There were twenty patients with septic sore throat at this time. The Standard Methods test for 1 ml. of this sample gave the following official results: safe, total plate count less than 200 per ml. and presumptive negative. 1/10 ml. of the same sample plated at the same time and incubated at the same temperature on pigs' feet agar, prepared according to Example VII, gave 153 colonies of streptococci after incubation at 37° C. for approximately twenty hours. Of these colonies, 98 were typical of streptococci of the Lancefield A group; 49 were typical of streptococci of the Viridans group; and 5 were typical of *Streptococcus faecalis*. A series of carbohydrate fermentation tests and results from other standard media verified these classification determinations. Tests using standard blood plates and Loeffler's medium were made for each sample in order to check the accuracy of results obtained by using the pigs' feet medium. These standard media required incubation for a minimum of 48 hours.

A Standard Methods test for a sample taken a week later gave, after 48 hours' incubation, presumptive negative results and a safe total count of 37 colonies on plates of tryptose-agar. The results of a count on 1 ml. of the sample on pigs' feet agar were 18 *Streptococcus salivarius* colonies and 300 colonies of streptococci of the Lancefield A group. The Standard Blood plate test and Loeffler's medium confirmed the presence of streptococci. Results of a Standard Methods test for 1 ml. of a sample taken the following day were presumptive negative. A duplicate sample plated on pigs' feet agar resulted in a count of 62 *Streptococcus salivarius* and over 300 colonies typical of Lancefield group A. These results were confirmed by Standard Blood plate tests and Loeffler's medium and by gram stains.

On the basis of these results, the pool was drained, scraped and thoroughly cleaned. After that, no new cases of septic sore throat were reported among the swimmers. The tests were continued for six weeks. Results of all tests were negative for both coliform and streptococci.

*Example IX*

The subject of study comprised eight indoor pools located in city schools. Samples from each of the pools were taken weekly. The weekly samples which were taken during the first four and one-half months of investigation gave negative results for streptococci. During January, an epidemic of septic sore throat occurred among the students of three of the schools; most of the patients had been swimming in the pools located in these three schools. Samples taken at this time from each of these pools gave negative coliform results and a safe total count according to the Standards Methods tests. Duplicate samples plated on pigs' feet medium, to which blood had been added, indicated the presence of many hemolytic streptococci, including streptococci of the Lancefield A group. The time required for a complete test including hemolysis was less than 24 hours. Test results were verified by gram stains. When the number of patients began to decrease, fewer colonies of streptococci were found on the pigs' feet medium. Samples taken immediately after the epidemic had ceased gave negative streptococci results on the pigs' feet medium.

Although this invention has been described with reference to illustrative embodiments thereof, it will be apparent to those skilled in the art that the principles of this invention may be embodied in other forms but within the scope of the appended claims.

I claim:

1. A medium for culturing bacteria which contains as an essential ingredient an extract of the skin of animals selected from the group consisting of swine, fowl and sheep.

2. A medium for culturing bacteria which contains as essential ingredients an extract of both skin and bone joints of animals selected from the group consisting of swine, fowl and sheep.

3. A medium for culturing bacteria which comprises as an essential ingredient an extract of the feet of animals selected from the group consisting of swine, fowl and sheep, said feet including both skin and bone joints.

4. A medium for culturing bacteria which contains as an essential ingredient an extract of the skin of swine.

5. A medium for culturing bacteria which contains as an essential ingredient an extract of the feet of swine, said feet including both skin and bone joints.

6. A medium for culturing bacteria which comprises an extract of both the skin and bone joints of animals selected from the group consisting of swine, fowl and sheep.

7. A medium for culturing bacteria which comprises an extract of the feet of swine, sucrose and a peptone, said feet including both skin and bone joints.

8. A medium for culturing bacteria which comprises an extract of the feet of swine, sucrose and a peptone selected from the group consisting of tryptose and tryptone, said feet including both skin and bone joints.

9. A medium for culturing streptococci which comprises an extract of both the skin and bone joints of animals selected from the group consisting of swine, fowl and sheep, sodium azide and an inhibiting agent selected from the group consisting of crystal violet and gentian violet.

10. A medium for culturing streptococci which comprises an extract of the feet of swine, sodium azide and an inhibiting agent selected from the group consisting of crystal violet and gentian violet, said feet including both skin and bone joints.

11. A medium for culturing streptococci which comprises an extract of the feet of swine, sucrose, a peptone, sodium azide and crystal violet, said feet including both skin and bone joints.

12. A medium for culturing streptococci which comprises an extract of the feet of swine, sucrose, a peptone selected from the group consisting of tryptose and tryptone, sodium azide and crystal violet, said feet including both skin and bone joints.

References Cited in the file of this patent

Levine et al.: A Compilation of Culture Media for the Cultivation of Microorganisms, 1930, Williams & Wilkins, Baltimore, pages 398, 589.

Gershenfeld: Bacteriology, 1945, Mack Pub. Co., pages 50, 58, 59, 60.

Porter: Bacterial Chemistry and Physiology, Wiley, 1946, pages 329, 330, 332.

Baltimore Biological Lab. Catalogue, 1948, page 10.

Jorgensen: Micro-organisms and Fermentation, 1948, Chas. Griffin, London, page 525.

Jacobs: Food and Food Products, vol. 2, pages 683 to 685.

Difco Manual, 9th ed., published by Difco Labs., Detroit, Mich., pages 32, 46 to 49, 15, 155, 156.